(12) United States Patent
Yamauchi et al.

(10) Patent No.: US 11,753,569 B2
(45) Date of Patent: Sep. 12, 2023

(54) HOT-MELT COMPOSITION AND SEALING MATERIAL

(71) Applicant: ASAHI CHEMICAL SYNTHETIC CO., LTD., Tokyo (JP)

(72) Inventors: Tomonobu Yamauchi, Tokyo (JP); Kazuya Furukawa, Tokyo (JP); Daisuke Kumon, Tokyo (JP); Takashi Koga, Tokyo (JP)

(73) Assignee: ASAHI CHEMICAL SYNTHETIC CO., LTD., Tokyo (JP)

( * ) Notice: Subject to any disclaimer, the term of this patent is extended or adjusted under 35 U.S.C. 154(b) by 890 days.

(21) Appl. No.: 16/636,984

(22) PCT Filed: Jul. 30, 2018

(86) PCT No.: PCT/JP2018/028468
§ 371 (c)(1),
(2) Date: Feb. 6, 2020

(87) PCT Pub. No.: WO2019/031290
PCT Pub. Date: Feb. 14, 2019

(65) Prior Publication Data
US 2020/0255712 A1 Aug. 13, 2020

(30) Foreign Application Priority Data
Aug. 7, 2017 (JP) ................................. 2017-152493

(51) Int. Cl.
| | | |
|---|---|---|
| C09J 191/00 | (2006.01) | |
| C09J 153/02 | (2006.01) | |
| C09J 125/08 | (2006.01) | |
| C08L 25/08 | (2006.01) | |
| C08L 25/04 | (2006.01) | |
| C09J 125/16 | (2006.01) | |

(52) U.S. Cl.
CPC ............. *C09J 191/00* (2013.01); *C08L 25/04* (2013.01); *C08L 25/08* (2013.01); *C09J 125/08* (2013.01); *C09J 125/16* (2013.01); *C09J 153/02* (2013.01); *C09J 153/025* (2013.01); *C08L 2203/162* (2013.01); *C08L 2205/03* (2013.01)

(58) Field of Classification Search
CPC .............................. C09J 153/02; C09J 125/08
See application file for complete search history.

(56) References Cited

U.S. PATENT DOCUMENTS

| 6,162,859 | A | * | 12/2000 | Lu | ............................. | C09J 7/387 |
| | | | | | | 524/505 |
| 2008/0306214 | A1 | * | 12/2008 | Kanderski | ............... | B32B 27/32 |
| | | | | | | 428/521 |

FOREIGN PATENT DOCUMENTS

| EP | 1 700 895 A1 | 9/2006 |
| JP | 2001-081277 A | 3/2001 |
| JP | 2006-249433 A | 9/2006 |
| JP | 2006241444 A * | 9/2006 |
| JP | 2008-127473 A | 6/2008 |
| JP | 2011-190287 A | 9/2011 |

OTHER PUBLICATIONS

Oct. 30, 2018 Search Report issued in International Patent Application No. PCT/JP2018/028468.

* cited by examiner

*Primary Examiner* — Vickey Nerangis
(74) *Attorney, Agent, or Firm* — Oliff PLC

(57) ABSTRACT

A hot-melt composition includes, with respect to 100 parts by mass of (A) a hydrogenated styrene thermoplastic elastomer having styrene-based polymer blocks at both ends and a hydrogenated diene polymer block at a middle portion and having a mass-average molecular weight of 250,000-600,000, 20-150 parts by mass of (B) a first styrene-based tackifying resin having a softening point of 135-160° C., 100-400 parts by mass of (C) a second styrene-based tackifying resin having a softening point of 105-135° C., 100-500 parts by mass of (D) a third tackifying resin for the hydrogenated diene polymer block having a softening point of 100-160° C. and 500-1,500 parts by mass of (E) a liquid softener. The hot-melt composition has excellent adhesion and easy peel ability, and is a material suitable as a sealing material for a lighting device of an automobile or the like.

11 Claims, No Drawings

HOT-MELT COMPOSITION AND SEALING MATERIAL

BACKGROUND OF THE INVENTION

Field of the Invention

The present invention relates to a hot-melt composition and a sealing material which are suitably used as a hot-melt adhesive in the fields of automobiles, vehicles and the like, more specifically, to a hot-melt composition and a sealing material which are excellent in adhesion to base materials and excellent in easy peel ability.

Description of the Related Art

In recent years, in various industrial fields such as electricity, automobiles, and construction, methods for adhering members used for assembly with a hot-melt adhesive have been widely used. For example, for assembly of headlamps or tail lamps of an automobile, a hot-melt adhesive which is obtained by blending a large amount of a softener in a thermo-plastic elastomer is used to bond a plastic housing which holds a light source and a lens which protects the light source. When the members are bonded with the hot-melt adhesive, it is desirable that a member for adhesion and an adherend are bonded with each other with a desired adhesive strength, but if the adhesion is too strong, it becomes difficult to replace the members when replacement of the members is required during use. In addition, when a product is disassembled after use, from the viewpoint of effective use of resources and environmental measures, it is desired that the members are easily separated, that is, the members are excellent in easy peel ability (or easy separation), in order to facilitate recycling of each member. As described above, for the hot-melt adhesive, it is desired that not only a good sealing property between the members is secured by imparting appropriate adhesion during bonding, but easy peel ability is also excellent.

Conventionally, as a hot-melt composition excellent in adhesion and easy peel ability, a composition is proposed in which polyphenylene ether and a large amount of liquid softener are blended with a styrene thermoplastic elastomer and a softening point is adjusted to 130° C.-240° C. (Patent Literature 1). In examples of this literature, a composition is described in which 100 parts by mass of polyphenylene ether, 200 parts by mass of a styrene-based resin (ENDEX155), and 500 parts by mass of process oil are blended with respect to 100 parts by mass of styrene thermoplastic elastomer (see Example 1). The hot-melt composition has characteristics of being excellent in heat resistance and adhesion and capable of being easily separated from adherend, but is not necessarily sufficient for current market demands for higher flexibility and adhesion.

In addition, in Patent Literature 2, a hot-melt composition having easy peel ability is proposed which is obtained by blending 5-500 parts by mass of a tackifier having a hydroxyl group and 350-2,000 parts by mass of a hydrocarbon-based plasticizer with respect to 100 parts by mass of SEEPS (a hydrogenated product of styrene-isoprene/butadiene-styrene type triblock polymer) or SEBS (a hydrogenated product of styrene-butadiene-styrene type triblock polymer) having a mass-average molecular weight of 250,000 or higher (see claim 1). In this composition, the easy peel ability is intended to be imparted by arranging a difference in polarity between a tackifying resin and polyolefin used as the base material, but there is a problem that heat stability and adhesion to the base material is low.

Furthermore, in Patent Literature 3, as a hot-melt composition suitable for use under severe conditions in automobile-related applications, a composition is proposed which is obtained by blending a hydrogenated hydrocarbon tackifier and a plasticizer in a styrene thermoplastic elastomer in which diene polymer blocks are hydrogenated (see claim 1), and it is described that a tackifying resin compatible with styrene-based polymer blocks at both ends, for example, homopolymers or copolymers of aromatic monomers such as styrene, α-methyl styrene, vinyltoluene, indene and the like, are preferably blended as a reinforcing resin for styrene-based polymer block phase (see paragraph 0020). Besides, in examples, a hot-melt composition is described which includes 8 parts by mass of a styrene thermoplastic elastomer (an equivalent mixture of hydrogenated styrene-based triblock polymer and hydrogenated styrene-based diblock polymer), 33 parts by mass of a tackifying resin, 46.3 parts by mass an oil and 2 parts by mass of an aromatic resin (ENDEX155) (see Example 1 and Table 1). However, since this composition includes a large amount of the styrene-based diblock polymer in the elastomer components, there is a problem that the heat resistance and cohesive force are insufficient, and further, retention ability of the liquid softener is inferior. In addition, in recent years, there is also a problem that an adhesive force to polycarbonate base materials which are frequently used as a member for automobile lamps is poor.

On the other hand, in Patent Literature 4, a hot-melt composition which focuses on an aromatic resin used as a tackifying resin is described, and it is described that by blending, with respect to 100 parts by mass of a styrene thermoplastic elastomer having a mass-average molecular weight of 200,000-500,000, 50-500 parts by mass of a styrene-based resin and 500-2,000 parts by mass of a hydrocarbon-based plasticizer, the hot-melt composition is obtained which is excellent in heat aging stability, adhesion and easy peel ability and is suitable as a sealing material of a lighting device of automobiles or the like (see claim 1, paragraphs 0025, 0062). Besides, in examples, a hot-melt composition is disclosed which includes, with respect to 100 parts by mass of SEEPS, 1,000 parts by mass of hydrocarbon-based plasticizer, and 100-500 parts by mass of an aromatic hydrocarbon resin (FMR150, manufactured by Mitsui Chemicals) as a styrene-based resin, or 75 parts by mass of the aromatic hydrocarbon resin and 75 parts by mass of a styrene-vinyltoluene copolymer (ENDEX 155, manufactured by Eastman Chemical Co., Ltd.) (see Table 1 and Table 2). However, the inventors examined the blending described in Patent Literature 4, and found that, in terms of this hot-melt composition, if a small amount of the aromatic resin is blended, adhesion to the polycarbonate base materials are insufficient, and in contrast, if a large amount of the aromatic resin is blended, viscosity of the hot-melt composition increases and fluidity deteriorates, or there is a tendency that deformation due to heat history occurs easily, and this hot-melt composition is not necessarily sufficient for market demands.

Patent Literature 1: Japanese Patent Laid-Open No. 2001-81277
Patent Literature 2: Japanese Patent Laid-Open No. 2008-127473
Patent Literature 3: Japanese Patent Laid-Open No. 2006-249433
Patent Literature 4: Japanese Patent Laid-Open No. 2011-190287

BRIEF SUMMARY OF THE INVENTION

The present invention is completed under the aforementioned related art, and an object of the present invention is to provide a hot-melt composition which is excellent in adhesion and easy peel ability. In addition, another object of the present invention is to provide a sealing material which is excellent in a sealing property and easy peel ability and is suitable for manufacture of a lighting device of an automobile or the like.

As a result of diligent investigations to solve the problems in the prior art, the inventors found that it is effective to use styrene-based resins having different softening points in combination in a specified proportion as the reinforcing resin for styrene-based polymer blocks of a styrene thermoplastic elastomer, and to blend the tackifying resin of the hydrogenated diene polymer block in a specified proportion, and completed the present invention.

Thus, according to the present invention, the following inventions are provided.

(1) A hot-melt composition comprising, with respect to 100 parts by mass of (A) a hydrogenated styrene thermoplastic elastomer having styrene-based polymer blocks at both ends and a hydrogenated diene polymer block at a middle portion and having a mass-average molecular weight (Mw) of 250,000-600,000, 20-150 parts by mass of (B) a first styrene-based tackifying resin having a softening point of 135-160° C., 100-400 parts by mass of (C) a second styrene-based tackifying resin having a softening point of 105-135° C., 100-500 parts by mass of (D) a third tackifying resin for the hydrogenated diene polymer block having a softening point of 100-160° C. and 500-1,500 parts by mass of (E) a liquid softener, wherein a difference between the softening point of the first styrene-based tackifying resin and the softening point of the second styrene-based tackifying resin is 10° C. or higher.

(2) The hot-melt composition according to (1), wherein with respect to 100 parts by mass of the styrene-based polymer blocks, an amount of the first styrene-based tackifying resin is 60-500 parts by mass, and an amount of the second styrene-based tackifying resin is 350-1,200 parts by mass.

(3) The hot-melt composition according to (1) or (2), wherein with respect to 100 parts by mass of the hydrogenated diene polymer block, an amount of the third tackifying resin is 140-700 parts by mass.

(4) The hot-melt composition according to any one of (1)-(3), wherein the third tackifying resin is a hydrogenated resin.

(5) The hot-melt composition according to any one of (1)-(4), wherein the hydrogenated styrene thermoplastic elastomer comprises the styrene-based polymer blocks in a proportion of 10-40 mass %.

(6) A sealing material comprising the hot-melt composition according to any one of the above (1)-(5).

(7) The sealing material according to (6), wherein a tensile strength of the sealing material at a tensile elongation of 1,000% at 20° C. is 0.8 kgf/cm$^2$ or lower.

According to the present invention, a hot-melt composition which is balanced between adhesion and easy peel ability and is excellent in heat resistance and weather resistance can be obtained by using two types of the tackifying resins (sometimes referred to as reinforcing resins) compatible with the styrene-based polymer blocks, that is, a resin having a high softening point and a resin having a low softening point in combination in a specified proportion, and blending a hydrogenated tackifying resin compatible with the hydrogenated diene-based polymer block in a specified proportion. In addition, by using the composition, a sealing material which is balanced between a sealing property and easy peel ability and is suitable for production of automobile lamps can be manufactured.

DETAILED DESCRIPTION OF THE INVENTION

Embodiments of the present invention are described in detail below, but the present invention is not limited to the embodiments. In addition, constituent elements in the following embodiments include the constituent elements which can be easily assumed by those skilled in the art or the constituent elements which are substantially the same.

A hot-melt composition of the present invention comprises, as essential components, (A) a hydrogenated styrene thermoplastic elastomer having styrene-based polymer blocks at both ends and a hydrogenated diene polymer block at a middle portion, and having a mass-average molecular weight (Mw) of 250,000-600,000, (B) a first styrene-based tackifying resin having a softening point of 135-160° C., (C) a second styrene-based tackifying resin having a softening point of 105-135° C., (D) a third tackifying resin for the hydrogenated diene polymer block having a softening point of 100-160° C. and (E) a liquid softener.

<Hydrogenated Styrene Thermoplastic Elastomer>

In the present invention, the hydrogenated styrene thermoplastic elastomer used as the component (A) has styrene-based polymer blocks at both ends and a hydrogenated diene polymer block at the middle portion, and has a mass-average molecular weight (Mw) of 250,000-600,000. In the present invention, the mass-average molecular weight of the hydrogenated styrene thermoplastic elastomer is an important requirement; if the value is too small, the heat resistance as a sealing material will be lacking, and in contrast, if the value is too high, a melt viscosity at the time of being used as a hot-melt adhesive becomes high and the discharge workability becomes deteriorated. The mass-average molecular weight is preferably 300,000-600,000, and more preferably 400,000-550,000.

The hydrogenated styrene thermoplastic elastomer is an A-B-A type triblock polymer consisting of (styrene-based polymer block)-(hydrogenated diene-based polymer block)-(styrene-based polymer block) and can be obtained by selectively hydrogenating a diene-based polymer block (block B') of an A-B'-A type (A represents a styrene-based polymer block, and B' represents a diene-based polymer block) triblock copolymer using a known method. A monomer used for producing the styrene polymer block (block A) is an aromatic vinyl compound, and specific examples of the monomer include styrene, α-methylstyrene, vinyltoluene, isopropenyltoluene and the like. In particular, styrene is most often used. In addition, a monomer used for producing the diene polymer block (block B') is a conjugated diene having 4-5 carbon atoms, and specific examples of the monomer include 1,3-butadiene, isoprene, 1,3-pentadiene and the like. In particular, 1,3-butadiene, isoprene or a mixture of them is used.

The hydrogenated styrene thermoplastic elastomer preferably has 10-50 mass % of the styrene-based polymer blocks and 90-50 mass % of the hydrogenated diene polymer block in order to balance adhesion and easy peel ability, and particularly preferably has 20-40 mass % of the styrene-based polymer blocks and 80-60 mass % of the hydrogenated diene polymer block. In addition, the styrene-based polymer blocks at both ends usually have substantially the same molecular weight, but they are not required to be the same.

The hydrogenated diene polymer block (block B) which is present between the two styrene polymer blocks is obtained by hydrogenating carbon-carbon double bonds contained in a diene polymer, and saturation bonds are reduced as a hydrogenation rate increases, and as a result, thermal stability or weather resistance of the polymer is improved. On the other hand, since complete hydrogenation involves manufacturing difficulties, it is sufficient that at least 50% or more, preferably 70% or more of the carbon-carbon double bonds is hydrogenated.

Specific examples of the hydrogenated styrene thermoplastic elastomer include SEBS which is a hydrogenated product of a styrene-butadiene-styrene (SBS) triblock copolymer, SEPS which is a hydrogenated product of a styrene-isoprene-styrene (SIS) triblock copolymer, SEEPS which is a hydrogenated product of a styrene-isoprene/butadiene-styrene (SIBS) triblock copolymer, and the like. Specific examples of the SEPS include Septon 2005 (styrene content 20 mass %, manufactured by Kuraray Co., Ltd.), Septon 2006 (styrene content 35 mass %, manufactured by Kuraray Co., Ltd.) and the like, specific examples of the SEBS include Kraton G1651 (styrene content 33 mass %, manufactured by Kraton Polymer Co., Ltd.), Septon 8006 (styrene content 33 mass %, manufactured by Kuraray Co., Ltd.), and the like, and specific examples of the SEEPS include Septon 4055 (styrene content 30 mass %, manufactured by Kuraray Co., Ltd.), Septon 4077 (styrene content 30 mass %, manufactured by Kuraray Co., Ltd.), Septon 4099 (styrene content 30 mass %, manufactured by Kuraray Co., Ltd.), and the like. In particular, the SEEPS is preferably used because of having an ability to retain the liquid softener and high tensile strength. Therefore, the hydrogenated styrene thermoplastic elastomer used as the component (A) preferably contains 50 mass % or more, more preferably 80 mass % or more of the SEEPS, particularly preferably contains the SEEPS only. The hydrogenated butadiene-isoprene copolymer which forms an intermediate block of the SEEPS usually has 10-90 mass %, preferably 30-70 mass % of butadiene-derived units, and 90-10 mass %, preferably 70-30 mass % of isoprene-derived units.

In addition, the hydrogenated styrene thermoplastic elastomer may be modified with a polar compound such as maleic anhydride, acrylic acid, methacrylic acid, a hydroxy group-containing compound, a phenol compound or the like, and may be an A-B-A-B-A type (A represents the styrene-based polymer block, B represents the hydrogenated diene-based polymer block) which also has a styrene-based polymer block at the middle portion in addition to the styrene-based polymer blocks at both ends.

<First Styrene-Based Resin>

In the present invention, the first styrene-based resin is used as the component (B). The softening point of this resin needs to be 135-160° C., and a preferred softening point is 140-160° C. If the softening point is below the lower limit, heat resistance becomes insufficient, and in contrast, if the softening point is higher than the upper limit, the softening point of the composition is increased, and a coating temperature when the composition is used as the hot-melt adhesive must be increased, resulting in energy efficiency reduction and composition deterioration due to heat during coating.

The styrene-based resin that is used is an addition polymer of an aromatic compound having an ethylenic carbon-carbon double bond, such as styrene, α-methyl styrene, vinyltoluene, isopropenyltoluene, indene, or the like, and usually a mass-average molecular weight is 1,000-10,000. The styrene-based resin may be a homopolymer of the above monomers or a copolymer of two or more monomers appropriately combined, and may be obtained by performing copolymerization taking a polymerizable component other than the aromatic compounds, for example, aliphatic olefin having five carbon atoms such as isoprene, 1,3-pentadiene, 2-methyl-2-butene or the like, and alicyclic olefin such as dicyclopentadiene, terpene, pinene, dipentene or the like, as a subsidiary component. Furthermore, the styrene-based resin may be modified with a phenol compound or maleic anhydride, acrylic acid, methacrylic acid or the like. In particular, a homopolymer or a copolymer which has an aromatic vinyl compound such as styrene, α-methyl styrene, vinyltoluene, isopropenyltoluene or the like as a main component is preferred, and a homopolymer or a copolymer which has styrene or α-methyl styrene as a main component is particularly preferred because of being excellent in weather resistance.

Specific examples of the styrene-based resin include Endex 155 (a softening point 153° C., manufactured by EASTMAN), Kristalex 5140 (a softening point 139° C., manufactured by EASTMAN), FMR0150 (a softening point 145° C., manufactured by Mitsui Chemicals), FTR2140 (137° C., manufactured by Mitsui Chemicals), Sylvales SA140 (a softening point 140° C., manufactured by Arizona Chemical) and the like.

The first styrene-based resin used as the component (B) may be a single resin, and may be obtained by appropriately using two or more resins in combination as necessary. A usage amount of the component (B) is 20-150 parts by mass, and preferably 50-100 parts by mass with respect to 100 parts by mass of the component (A). If the content of the component (B) is excessively small, the heat resistance becomes insufficient, and in contrast, if the content is excessively large, the flexibility of the composition is lowered and the easy peel ability is impaired. In addition, the usage amount of the component (B) is preferably 60-500 parts by mass, and particularly preferably 150-350 parts by mass with respect to 100 parts by mass of the styrene-based polymer blocks in the component (A).

<Second Styrene-Based Resin>

In the present invention, the second styrene-based resin is used as the component (C). The softening point of this resin needs to be 105-135° C., and a preferred softening point is 110-130° C. If the softening point is lower than the lower limit, the heat resistance becomes insufficient, and in contrast, if the softening point is higher than the upper limit, the flexibility and the adhesion are lowered.

The second styrene-based resin that is used is the same as the first styrene-based resin except that the softening point is low. Specific examples of this second styrene-based resin include Kristalex 1120 (a softening point 120° C., manufactured by EASTMAN), FTR2120 (a softening point 125° C., manufactured by Mitsui Chemicals), FTR6110 (a softening point 110° C., manufactured by Mitsui Chemicals), FTR6125 (a softening point 125° C., manufactured by Mitsui Chemicals), FTR8120 (a softening point 120° C., manufactured by Mitsui Chemicals) and the like.

The second styrene-based resin used as the component (C) may be a single resin, and may be obtained by appropriately using two or more resins in combination as necessary. A usage amount of the component (C) is 100-400 parts by mass, and preferably 150-300 parts by mass with respect to 100 parts by mass of the component (A). If the content of the component (C) is excessively small, the adhesion becomes insufficient, and in contrast, if the content is excessively large, the heat resistance becomes insufficient. In addition, the usage amount of the component (C) is preferably 300-1,200 parts by mass, and particularly preferably 450-1,000 parts by mass with respect to 100 parts by mass of the styrene-based polymer blocks in the component (A).

<Combination Use of First Styrene-Based Resin and Second Styrene-Based Resin>

In the present invention, it is important to use styrene-based resins having different softening points compatible with the styrene polymer blocks contained in the component (A), that is, use the first styrene-based resin and the second styrene-based resin in combination. The difference between the softening points of the two resins needs to be 10° C. or higher, and preferably 15° C. or higher. By including the first styrene-based resin having a high softening point and the second styrene-based resin having a low softening point, a composition excellent in both heat resistance and adhesion can be obtained.

Moreover, as the first styrene-based resin or the second styrene-based resin, when two or more resins belonging to a range of the softening point specified by each component are used in combination, a value obtained as a weighted average in consideration of the softening point of each resin and a combination ratio is defined as the softening point of each component.

The use ratios of the component (B) and the component (C) with respect to the component (A) is as described above, and in particular, when a ratio of the component (B) and the component (C) [component (B)/component (C), a mass ratio] is 5/4-1/15, further is 2/3-1/6, both the heat resistance and the adhesion can be achieved.

<Third Tackifying Resin>

In the present invention, the third tackifying resin is used as the component (D). The tackifying resin is a resin which is compatible with the hydrogenated diene polymer block contained in the component (A), and has a softening point of 100-160° C., preferably 120-160° C., and particularly preferably 130-160° C. If the softening point is lower than the lower limit, the heat resistance becomes insufficient, and in contrast, if the softening point is higher than the upper limit, the flexibility is lowered and the easy peel ability is impaired.

The third tackifying resin that is used is not particularly limited as long as it can be compatible with a hydrogenated product of the diene-based polymer such as polybutadiene, polyisoprene, butadiene-isoprene copolymer, and the like and can impart tackiness, and specific examples of the third tackifying resin include, for example, rosin-based resins such as gum rosin, tall oil rosin, wood rosin, hydrogenated rosin, disproportionated rosin, polymerized rosin, maleated rosin, rosin glycerin ester, hydrogenated rosin glycerin ester and the like; alicyclic resins such as a terpene resin (mainly α-pinene, mainly β-pinene, mainly dipentene or the like), a hydrogenated terpene resin, an aromatic hydrocarbon modified terpene resin, a hydrogenated aromatic hydrocarbon modified terpene resin, a terpene phenol copolymer resin, a hydrogenated terpene phenol copolymer resin, a dicyclopentadiene-based resin, a hydrogenated dicyclopentadiene-based resin, and the like; aliphatic hydrocarbon resins such as a C5-based hydrocarbon resin, a hydrogenated C5-based hydrocarbon resin, a C5/C9-based hydrocarbon resin, a hydrogenated C5/C9-based hydrocarbon resin, a hydrogenated C9-based hydrocarbon resin, phenol resins such as an alkylphenol resin, a rosin-modified phenolic resin, and the like.

Among these tackifying resins, resins in which unsaturated bonds are reduced by hydrogenation are preferably used because of being excellent in heat resistance, weather resistance, hue, odor and the like. In particular, the hydrogenated alicyclic resin such as Imary P140 (manufactured by Idemitsu Kosan Co., Ltd., a softening point 140° C.), ECR5340 (manufactured by Exxon Mobil Co., Ltd., a softening point 140° C.), Alcon P140 (manufactured by Arakawa Chemical Co., Ltd., a softening point 140° C.), Imary P125 (manufactured by Idemitsu Kosan Co., Ltd., a softening point 125° C.), Alcon P125 (manufactured by Arakawa Chemical Co., Ltd., a softening point 125° C.), Regalite R1125 (manufactured by Eastman Chemical Co., Ltd., a softening point 125° C.), ECR5320 (manufactured by Exxon Mobil Co., Ltd., a softening point 120° C.), or the like is preferable in terms of compatibility with the hydrogenated diene polymer block.

The third tackifying resin used as the component (D) may be a single resin, or may be obtained by appropriately using two or more resins in combination as necessary. A usage amount of the component (D) is 100-500 parts by mass, and preferably 200-450 parts by mass with respect to 100 parts by mass of the component (A). If the content of the component (D) is excessively small, increase in the melt viscosity or reduction in the flexibility is caused, and in contrast, if the content is excessively large, the adhesion is lowered. In addition, the usage amount of the component (D) is preferably 140-700 parts by mass, and particularly preferably 250-600 parts by mass with respect to 100 parts by mass of the hydrogenated diene polymer block in the component (A).

<Liquid Softener>

In the present invention, the liquid softener is used as the component (E). The liquid softener is blended to adjust the viscosity of the composition and impart flexibility, and is used in a proportion of 500-1,500 parts by mass, preferably 700-1,200 parts by mass with respect to 100 parts by mass of the component (A). If a blending amount of the liquid softener is too small, the flexibility is impaired, and in contrast, if the blending amount is too large, the heat resistance is lowered.

The liquid softener that is used can be used without particular limitation as long as it is conventionally used for a hot-melt composition having a styrene thermoplastic elastomer as a base polymer. Specific examples of the liquid softener include, for example, paraffinic, naphthenic or aromatic process oil; a liquid polymer such as liquid polybutene, liquid polybutadiene, liquid polyisoprene or the like; hydrocarbon oil such as liquid paraffin, olefin process oil or the like; an oily material having polarity such as dioctyl phthalate (DOP), dibutyl phthalate (DBP), dioctyl adipate, isodecyl succinate, diethylene glycol dibenzoate, pentaerythritol ester, butyl oleate, methyl acetylricinoleate, tricresyl phosphate, trioctyl phosphate, adipate propylene glycol polyester, adipate butylene glycol polyester; and the like.

The liquid softeners may be used alone or in appropriate combinations as required. In particular, from the viewpoint of compatibility with the base polymer and heat resistance, a nonpolar hydrocarbon-based oily material, particularly the paraffinic process oil is preferably used.

<Other Blending Agents>

In the present invention, in addition to the above components (A) to (E), an elastomer component other than the component (A) which is usually used in the technical field of hot-melt compositions having a styrene thermoplastic elastomer as a base polymer, a blending agent such as an antioxidant, an UV absorber, a filler, a silane coupling agent, a pigment, a dye, an antistatic agent, a flame retardant, a stabilizer, a solvent, an antifoaming agent or the like can be blended as necessary.

The elastomer component other than the component (A) may be a hydrogenated A-B-A type styrene thermoplastic elastomer having a mass-average molecular weight of less than 250,000, an A-B'-A type styrene thermoplastic elastomer in which a diene polymer block is not hydrogenated, an A-B type styrene thermoplastic elastomer, an A-B' type styrene thermoplastic elastomer in which a diene polymer block is not hydrogenated, or the like. These components may be included in a form of substituting a part of the component (A) in a range where the effects of the present invention are not essentially disturbed; however, if the amount increases, the heat resistance or the weather resistance is inferior, and thus the amount is preferably 40 mass % or less, more preferably 20 mass % or less of the base elastomer component, and in particularly, it is most preferable that these components are not contained in the base elastomer component. When a part of the component (A) is replaced by other elastomers as described above, the amount of the component (A) which is a standard for the ratio to the components (B) to (E) is treated as 100 parts by mass of component (A) with an amount of the whole elastomer including the other elastomers.

A primary antioxidant may be a naphthylamine-based antioxidant, a p-phenylenediamine-based antioxidant, a quinoline-based antioxidant, a phenol-based antioxidant, a hindered phenol-based antioxidant, a hindered amine-based antioxidant or the like, and in particular, the hindered phenol-based antioxidant is preferably used. A secondary antioxidant may be a phosphite-based antioxidant, a thioether-based antioxidant, a hydroxylamine-based antioxidant or the like, and in particular, the phosphite-based antioxidant is preferably used. From the viewpoint of an antioxidant effect and thermal stability of the composition, a content of the primary antioxidant and the secondary antioxidant is preferably 1-30 parts by mass, and particularly preferably 2-20 parts by mass with respect to 100 parts by mass of the component (A).

The UV absorber may be a benzotriazole-based absorber, a triazine-based absorber, a benzophenone-based absorber, a cyanoacrylate-based absorber or the like, and in particular, the benzotriazole-based absorber is preferably used. From the viewpoint of the weather resistance of the composition, a content of the UV absorber is preferably 1-30 parts by mass, and particularly preferably 2-20 parts by mass with respect to 100 parts by mass of the component (A). A conventionally well-known filler can be used as the filler, and an inorganic or organic filler of various shapes can be mentioned. By blending the filler, a cured product can be strengthened, and can exhibit excellent adhesion to, for example, mortar, metal and the like. The inorganic filler may be, for example, calcium carbonate, zinc oxide, glass beads, titanium oxide, alumina, carbon black, clay, ferrite, talc, mica powder, aerosil, silica, an inorganic fiber such as a glass fiber or the like, and an inorganic foam. The organic filler may be powder of a thermosetting resin such as an epoxy resin or the like, carbon fiber, synthetic fiber, synthetic pulp or the like.

The silane coupling agent may be, for example, trimethoxyvinyl silane, γ-glycidoxypropyltrimethoxy silane or the like. When these silane coupling agents are blended, an effect of improving adhesion to a wet surface can be obtained. The pigment may be an inorganic pigment such as titanium oxide, zinc oxide, ultramarine, bengara, lithopone, lead, cadmium, iron, cobalt, aluminum, hydrochloride, sulfate or the like; or an organic pigment such as Neozapon Black RE, Neo Black RE, Orasol Black CN, Orasol Black Ba (all manufactured by Ciba Geigy), Spilon Blue 2BH (manufactured by Hodogaya Chemical Co., Ltd.) or the like, and these pigments can be used in appropriate combination as necessary.

A black dye, a yellow dye, a red dye, a blue dye, a brown dye, and the like are appropriately selected and used as the dye depending on the color required for the product. The antistatic agent may be, for example, a hydrophilic compound such as a quaternary ammonium salt, a polyglycol, an ethylene oxide derivative or the like. The flame retardant may be, for example, chloroalkyl phosphate, dimethyl/methyl phosphate, bromine/phosphorus compound, ammonium polyphosphate, neopentyl bromide-polyether, or brominated polyether. The stabilizer may be, for example, a fatty acid silyl ester, a fatty acid amide trimethylsilyl compound or the like. The antifoaming agent may be, for example, calcium oxide, magnesium oxide, molecular sieve.

A method for producing the hot-melt composition of the present invention is not particularly limited, and the hot-melt composition can be produced by a conventionally known method. For example, each of the components (A) to (E) and other components to be blended as required are put into a kneader heated near a temperature at which these components can be melted. These components are sufficiently melted and mixed, and thereby the hot-melt composition can be obtained. The kneader may be, for example, a Banbury mixer equipped with a heating device and a defoaming device, a pressure kneader, a Henschel mixer, a Brabender kneader, or a disper. The inside of the kneader can be depressurized as necessary. The obtained hot-melt composition can be filled and stored in, for example, a mold release box, a pail can, or a drum can.

The softening point of the hot-melt composition of the present invention is usually 130-240° C., and preferably 150-200° C. If the softening point is too low, the heat resistance is insufficient, and in contrast, if the softening point is too high, the operation for melting becomes difficult. In addition, the melt viscosity of the hot-melt composition changes depending on a measurement temperature, and from the viewpoint of operability in coating, the melt viscosity at 210° C. is preferably 5,000-200,000 mPa·s, and particularly preferably 10,000-150,000 mPa·s.

Base materials to which the hot-melt composition of the present invention can be applied, that is, a member for adhesion and an adherend are not particularly limited. For example, the base materials may be polyolefins such as polyethylene, polypropylene, polybutene and polystyrene; engineering plastics such as polycarbonate, polyester, polyamide and polyacetal; metal, glass and rubber.

The application of the hot-melt composition of the present invention is not particularly limited, and for example, the hot-melt composition can be used for applications such as automobiles or vehicles (bullet trains, trains), electrical products, building materials, woodwork, bookbinding packaging, and the like. Applications related to automobiles may be adhesion of interior materials such as ceilings, doors, and seats, adhesion or sealing of exterior materials such as automobile lighting device like lamps, side moldings, and the like. Specifically, the hot-melt composition can be suitably used to adhere and seal a plastic housing which holds a light source and a lens which protects the light source during the manufacturing of the automobile lighting device. In addition, electrical-related applications may be assembly of a lamp shade, a speaker, and the like. Furthermore, applications related to building materials or woodwork may be adhesion of doors, access floors, multi-layer floors, furniture assembly, edge bonding, profile wrapping, and the like in construction sites and factory manufacturing of building material.

<Sealing Material>

The sealing material of the present invention is obtained by using the above hot-melt composition, and is generally referred to as a gasket, packing, sealing, caulking, putty or the like. The shape of the sealing material is not particularly limited, and may be any shape such as a pellet shape, a powder shape, a string shape, a belt shape or the like.

In terms of achieving both the adhesion and the easy peel ability between the members, preferably, a tensile strength of the sealing material at a tensile elongation of 1,000% at 20° C. is 0.8 kgf/cm$^2$ or lower, furthermore 0.6 kgf/cm$^2$ or lower, and particularly 0.5 kgf/cm$^2$ or lower, and in a range of −20-100° C., a tensile elongation ratio is 1,000% or higher, particularly 1,200% or higher. Furthermore, recently, there are increasing occasions in which a member of polyolefin typified by polypropylene and a member made of polycarbonate are adhered with a hot-melt adhesive, and thus it is appropriate for ensuring sealing property that adhesion strength to polycarbonate (PC) at 20° C. is 1.5 kgf/cm$^2$, and particularly 2.0 kgf/cm$^2$ or higher.

A sealing method using the sealing material of the present invention is not particularly limited and may be carried out according to a conventional method. For example, when an automobile lamp housing is mounted using a hot-melt type sealing material, the mounting can be carried out as follows.

The hot-melt composition is usually heat-coated automatically or manually to a member surface requiring sealing by using a heat-coating device called an applicator. The heat-coating device is a device which can suck a given amount of a molten hot-melt composition with a gear pump or the like, and is used by appropriately heating in accordance with the softening point of the hot-melt composition. The coating shape of the hot-melt composition is not particularly limited, and usually, the hot-melt composition is heat-coated to a member to be sealed such as a lamp housing surface. Thereafter, another member is brought into contact with the member to which the hot-melt composition is applied and mechanically tightened, thereby forming the lamp housing in which an adhered surface is sealed.

In addition to the method of forming a loop shape by heat-coating to the lamp housing surface of the automobile, a loop-shaped gasket required for maintaining water-tightness of the automobile lamp can be made in advance and then applied to the lamp housing surface automatically or manually. This gasket can be made by preparing release paper, a release film made of polytetrafluoroethylene, or the like, and heat-coating the hot-melt composition into a predetermined shape thereon.

When it becomes necessary to replace the assembled lamp housing, or when it becomes necessary to disassemble the product after use and separate it into a lens and a housing, the following can be performed. Since the sealing material of the present invention is excellent in easy peel ability, the lens and the housing can be easily detached by just releasing restraint of mechanically tightened parts without using a detachment tool such as an industrial dryer for heating the sealing material and reducing the viscosity of the sealing material as before, a plastic bar or the like.

In this case, the sealing material used in a gap between the lens and the housing is adhered to each contact surface, but the cohesive force of the sealing material is larger than the adhesive force, and thus interfacial peeling is resulted, and a residual of the sealing material can be easily peeled without remaining on the contact surfaces. As described above, when the sealing material of the present invention is used, the lens and the housing can be easily detached without requiring a special disassembling tool or the like as in the case of using the molded gasket.

Accordingly, the hot-melt composition of the present invention has excellent performance in terms of having heat resistance, adhesion to the base materials and flexibility. In addition, the sealing material prepared from the hot-melt composition is excellent in having both the sealing property and the easy peel ability between the members and having excellent heat resistance.

EXAMPLES

The present invention will be described below more specifically with reference to examples, but the present invention is not limited to these examples. Moreover, "parts" and "%" in the examples and comparative examples are based on mass unless otherwise specified. In addition, evaluation method of physical properties is as follows.

(1) Softening point: Measured in reference to JAI-7-1997.
(2) Melt viscosity: Measured at 210° C. using an automatic viscometer (model: BROOKFIELD DV-II+Pro) manufactured by Brookfield. Spindle No. of the automatic viscometer used for the measurement is No. 29, and the rotation speed is set to 5 rpm.
(3) Tensile strength: the hot-melt sealing material is processed into a size of 10 mm 50 mm×2 mm and pulled at a speed of 500 mm/min in an environment of −20° C., 20° C. and 100° C., and the strengths (kgf/cm$^2$) at a tensile elongation of 500% and 1,000% are measured.
(4) Elongation: the elongation ratio (%) when a test piece is broken in the tensile strength measurement of (3) is measured.
(5) Adhesion and adhesive force to polycarbonate: the hot-melt sealing material is processed into a size of 10 mm×10 mm×3 mm and clamped between polycarbonate plates (PC1600 manufactured by C.I. TAKIRON Corporation) of 25 mm×50 mm×3 mm, and then the hot-melt sealing material is compressed until the thickness is reduced by 50% (compressed from the thickness of 3 mm to the thickness of 1.5 mm), released after being kept still at room temperature for 72 hours, and a test piece is obtained after 24 hours. Under an environment of 20° C., the test piece is pulled at a speed of 50 mm/min, and an adhesion strength when the test piece is peeled off from the base materials is measured. Evaluation is performed in the following four stages based on the adhesion strength.
⊚ (Excellent): 2.0 kgf/cm$^2$ or higher
○ (Good): 1.5 kgf/cm$^2$ or higher and less than 2.0 kgf/cm$^2$
Δ (Fair): 1.0 kgf/cm$^2$ or higher and less than 1.5 kgf/cm$^2$
x (Poor): less than 1.0 kgf/cm$^2$
(6) Heat sagging resistance: the hot-melt sealing material processed into a 10 mm square cube is adhered to an aluminum plate and kept still in a 140° C. environment to be observed for shape change after 72 hours, and a degree of shape change is evaluated in the following four stages.
⊚ (Excellent): No change in shape
○ (Good): Slight deformation
Δ (Fair): partial flow
x (Poor): complete flow (7) Flexibility: the strength at a tensile elongation of 1,000% at 20° C. in the above (3) is evaluated in the following four stages.
  ⊚ (Excellent): 0.5 kgf/cm² or lower
  ○ (Good): more than 0.5 kgf/cm² and 0.8 kgf/cm² or lower
  Δ (Fair): more than 0.8 kgf/cm² and 1.2 kgf/cm² or lower
  x (Poor): more than 1.2 kgf/cm²

Example 1

The hot-melt composition, which includes 100 parts of SEEPS (Septon4099, mass-average molecular weight 500,000, styrene content 30%, manufactured by Kuraray Co., Ltd.) as the component (A), 50 parts of Sylvares SA140 (manufactured by Arizona Chemical, softening point 140° C., mass-average molecular weight 4,200) which is an α-methyl styrene polymer as the component (B), 200 parts of Kristalex 1120 (manufactured by EASTMAN, softening point 119° C., mass-average molecular weight 2,200) which is a copolymer of styrene and α-methyl styrene as the component (C), 200 parts of Imarv P140 (manufactured by Idemitsu Kosan Co., Ltd., softening point 140° C., mass-average molecular weight 3,800) which is a hydrogenated alicyclic tackifying resin as the component (D), 800 parts of paraffinic process oil (Diana process oil PW90, manufactured by Idemitsu Kosan Co., Ltd.) as the component (E), 5 parts of Irganox1010 (manufactured by BASF) as the primary antioxidant and 5 parts of Tinuvin326 (manufactured by BASF) as the UV absorber, is prepared by mixing and heating each component. For the obtained composition, tensile strength, elongation, adhesion to polycarbonate, and heat sagging resistance are measured. The results are shown in Table 1.

Examples 2-8 and Comparative Examples 1-4

The hot-melt composition is prepared in a way similar to Example 1 except that compositions of the components (A) to (E) are changed to those shown in Table 1, and the obtained composition is evaluated in a way similar to Example 1. The results are shown in Table 1 and Table 2.

Moreover, the materials used in Examples 2-8 and Comparative examples 1-4 are as follows.
  Kraton G1633 (manufactured by Kraton Polymer): SEBS, mass-average molecular weight 450,000, styrene content 30%
  Kristalex5140 (manufactured by EASTMAN): a copolymer of styrene and α-methyl styrene, softening point 140° C., mass-average molecular weight 5,100
  FTR2120 (manufactured by Mitsui Chemicals): a copolymer of styrene and α-methyl styrene, softening point 125° C., mass-average molecular weight 2,000
  ECR5340 (manufactured by Exxon Mobil): hydrogenated alicyclic tackifying resin, softening point 140° C., mass-average molecular weight 700

TABLE 1

| | | Ingredients | Composition | Softening point | Example 1 | Example 2 | Example 3 | Example 4 | Example 5 | Example 6 |
|---|---|---|---|---|---|---|---|---|---|---|
| Hot-melt composition (parts by mass) | A | Septon4099 | SEEPS | | 100 | 100 | 100 | 100 | 100 | 100 |
| | | Kraton G1633 | SEBS | | | | | | | |
| | B | Sylvares SA140 | α-methyl styrene | 140° C. | 50 | 50 | 100 | 100 | | 50 |
| | | Kristalex5140 | Styrene-α-methyl styrene | 140° C. | | | | | 50 | |
| | C | Kristalex1120 | Styrene-α-methyl styrene | 119° C. | 200 | 300 | 150 | 200 | 200 | |
| | | FTR2120 | Styrene-α-methyl styrene | 120° C. | | | | | | 200 |
| | | Sylvares SA100 | α-methyl styrene | 100° C. | | | | | | |
| | D | Imarv P140 | Hydrogenated alicyclic tackifying resin | 140° C. | 200 | 200 | 200 | 200 | 200 | 200 |
| | | ECR5340 | Hydrogenated alicyclic tackifying resin | 140° C. | | | | | | |
| | E | PW90 | Process oil | | 800 | 800 | 800 | 800 | 800 | 800 |
| | | Irganox1010 | Primary antioxidant | | 5 | 5 | 5 | 5 | 5 | 5 |
| | | Tinuvin326 | UV absorber | | 5 | 5 | 5 | 5 | 5 | 5 |
| | Component B/100 parts of styrene block | | | | 167 | 167 | 333 | 333 | 167 | 167 |
| | Component C/100 parts of styrene block | | | | 667 | 999 | 500 | 667 | 667 | 667 |
| Physical property value | Melt viscosity (mPa·s) | | | 210° C. | 26,200 | 12,200 | 28,800 | 22,200 | 27,600 | 25,500 |
| | Tensile strength (kgf/cm²) | | tensile elongation of 500% | 100° C. | 0.10 | 0.15 | 0.08 | 0.15 | 0.10 | 0.10 |
| | | | tensile elongation of 1000% | | 0.20 | 0.20 | 0.18 | 0.20 | 0.20 | 0.20 |

TABLE 1-continued

| Ingredients | Composition | Softening point | Example 1 | Example 2 | Example 3 | Example 4 | Example 5 | Example 6 |
|---|---|---|---|---|---|---|---|---|
| | tensile elongation of 500% | 20° C. | 0.15 | 0.20 | 0.18 | 0.15 | 0.18 | 0.18 |
| | tensile elongation of 1000% | | 0.30 | 0.48 | 0.35 | 0.40 | 0.35 | 0.33 |
| Elongation (%) | | 100° C. | 1,600 | 1,200 | 1,100 | 1,100 | 1,600 | 1,500 |
| | | 20° C. | 2,200 | 2,200 | 2,200 | 2,200 | 2,200 | 2,200 |
| | | −20° C. | 1,400 | 1,200 | 1,300 | 1,200 | 1,300 | 1,300 |
| Adhesion strength (kgf/cm$^2$) | | 20° C. | 2.41 | 2.86 | 1.56 | 1.80 | 2.30 | 2.22 |
| Heat sagging resistance | | 140° C. | ⊚(Excellent) | ○(Good) | ⊚(Excellent) | ⊚(Excellent) | ⊚(Excellent) | ⊚(Excellent) |
| Flexibility | 20° C. 1000% modulus | | ⊚(Excellent) | ⊚(Excellent) | ⊚(Excellent) | ⊚(Excellent) | ⊚(Excellent) | ⊚(Excellent) |
| Adhesive force | 20° C. Adhesion strength | | ⊚(Excellent) | ⊚(Excellent) | ⊚(Excellent) | ⊚(Excellent) | ⊚(Excellent) | ⊚(Excellent) |
| Heat resistance | 140° C. Heat sagging resistance | | ⊚(Excellent) | ○(Good) | ⊚(Excellent) | ⊚(Excellent) | ⊚(Excellent) | ⊚(Excellent) |

TABLE 2

| | | Ingredients | Composition | Softening point | Example 7 | Example 8 | Comparative example 1 | Comparative example 2 | Comparative example 3 | Comparative example 4 |
|---|---|---|---|---|---|---|---|---|---|---|
| Hot-melt composition (parts by mass) | A | Septon4099 | SEEPS | | 100 | 80 | 100 | 100 | 100 | 100 |
| | | Kraton G1633 | SEBS | | | 20 | | | | |
| | B | Sylvares SA140 | α-methyl styrene | 140° C. | 50 | 50 | 300 | | | 200 |
| | | Kristalex5140 | Styrene-α-methyl styrene | 140° C. | | | | | | |
| | C | Kristalex1120 | Styrene-α-methyl styrene | 119° C. | 200 | 200 | | 300 | 100 | 100 |
| | | FTR2120 | Styrene-α-methyl styrene | 120° C. | | | | | | |
| | | Sylvares SA100 | α-methyl styrene | 100° C. | | | | | 200 | |
| | D | Imarv P140 | Hydrogenated alicyclic tackifying resin | 140° C. | | 200 | 200 | 200 | 200 | 200 |
| | | ECR5340 | Hydrogenated alicyclic tackifying resin | 140° C. | 200 | | | | | |
| | E | PW90 | Process oil | | 800 | 800 | 800 | 800 | 800 | 800 |
| | | Irganox1010 | Primary antioxidant | | 5 | 5 | 5 | 5 | 5 | 5 |
| | | Tinuvin326 | UV absorber | | 5 | 5 | 5 | 5 | 5 | 5 |
| | Component B/100 parts of styrene block | | | | 167 | 167 | 999 | 0 | 0 | 667 |
| | Component C/100 parts of styrene block | | | | 667 | 667 | 0 | 999 | 333 | 333 |
| Physical property value | Melt viscosity (mPa · s) | | | 210° C. | 24,800 | 20,600 | 64,000 | 13,400 | 10,900 | 33,300 |
| | Tensile strength (kgf/cm$^2$) | Tensile elongation of 500% | | 100° C. | 0.10 | 0.08 | 0.20 | 0.10 | 0.05 | 0.15 |
| | | Tensile elongation of 1000% | | | 0.20 | 0.18 | 0.30 | 0.15 | — | — |
| | | Tensile elongation of 500% | | 20° C. | 0.15 | 0.18 | 0.40 | 0.15 | 0.20 | 0.22 |
| | | Tensile elongation of 1000% | | | 0.31 | 0.40 | 1.85 | 0.36 | 0.55 | 0.95 |

TABLE 2-continued

| Ingredients | Composition | Softening point | Example 7 | Example 8 | Comparative example 1 | Comparative example 2 | Comparative example 3 | Comparative example 4 |
|---|---|---|---|---|---|---|---|---|
| Elongation (%) | | 100° C. | 1,500 | 1,200 | 1,100 | 1,600 | 600 | 600 |
| | | 20° C. | 2,200 | 2,200 | 1,700 | 2,200 | 2,200 | 2,100 |
| | | −20° C. | 1,500 | 1,200 | 1,300 | 1,300 | 1,200 | 1,000 |
| Adhesion strength (kgf/cm$^2$) | | 20° C. | 2.36 | 2.15 | 1.25 | 2.68 | 1.46 | 2.66 |
| Heat sagging resistance | | 140° C. | Good | Good | Excellent | Fair | Poor | Excellent |
| Flexibility | 20° C. 1000% Modulus | | ⊚(Excellent) | ⊚(Excellent) | X (Poor) | ⊚(Excellent) | ⊚(Excellent) | Δ(Fair) |
| Adhesive force | 20° C. Adhesion strength | | ⊚(Excellent) | ⊚(Excellent) | ○(Good) | ⊚(Excellent) | ○(Good) | ⊚(Excellent) |
| Heat resistance | 140° C. Heat sagging resistance | | ⊚(Excellent) | ○(Good) | ⊚(Excellent) | Δ(Fair) | X (Poor) | ⊚(Excellent) |

From the results in Tables 1 and 2, it can be seen that the hot-melt composition of the present invention in which the first styrene-based resin and the second styrene-based resin are used in combination exhibits excellent performance in flexibility, adhesion, and heat resistance. When a product which is obtained by adhering a member made of polycarbonate and a member made of polypropylene is assembled using the sealing material consisting of the hot-melt composition of the present invention, the product has sufficient sealing property. In addition, the product could be easily disassembled into each part without using a special tool.

On the other hand, when the second styrene-based resin is not included (Comparative example 1), the flexibility is insufficient, and the adhesion to polycarbonate is not satisfactory. In contrast, when the first styrene-based resin is not included (Comparative examples 2 and 3), the adhesion and the heat resistance are poor. In addition, when the amount of the first styrene-based resin is too large (Comparative example 4), the flexibility is insufficient and the elongation at 100° C. is insufficient. Automobile lamps assembled taking a hot-melt composition with insufficient elongation at a high temperature as a sealing material do not follow external impacts easily due to insufficient elongation when used at a high temperature, and it is difficult to obtain sufficient sealing property.

INDUSTRIAL APPLICABILITY

The hot-melt composition of the present invention has appropriate adhesion to both polycarbonate having a polarity and nonpolar polyolefin, and the members can be easily separated at the time of disassembly, and thus the hot-melt composition is suitable as a hot-melt type sealing material for automobile lamps. In addition, the hot-melt composition is also useful as a waterproof sealing material for automobile parts, electrical products, and building members using plastic and metal as an adherend.

What is claimed is:

1. A hot-melt composition comprising, with respect to 100 parts by mass of (A) a hydrogenated styrene thermoplastic elastomer having styrene-based polymer blocks at both ends and a hydrogenated diene polymer block at a middle portion and having a mass-average molecular weight of 250,000-600,000, 20-150 parts by mass of (B) a first styrene-based tackifying resin having a softening point of 135-160° C., 100-400 parts by mass of (C) a second styrene-based tackifying resin having a softening point of 105-135° C., 100-500 parts by mass of (D) a third tackifying resin for the hydrogenated diene polymer block having a softening point of 100-160° C. and 500-1,500 parts by mass of (E) a liquid softener, wherein a difference between the softening point of the first styrene-based tackifying resin and the softening point of the second styrene-based tackifying resin is 10° C. or higher.

2. The hot-melt composition according to claim 1, wherein with respect to 100 parts by mass of the styrene-based polymer blocks, an amount of the first styrene-based tackifying resin is 60-500 parts by mass, and an amount of the second styrene-based tackifying resin is 350-1,200 parts by mass.

3. The hot-melt composition according to claim 1, wherein with respect to 100 parts by mass of the hydrogenated diene polymer block, an amount of the third tackifying resin is 140-700 parts by mass.

4. The hot-melt composition according to claim 1, wherein the third tackifying resin is a hydrogenated resin.

5. The hot-melt composition according to claim 1, wherein the liquid softener is paraffin-based process oil.

6. The hot-melt composition according to claim 1, wherein the hydrogenated styrene thermoplastic elastomer comprises the styrene-based polymer blocks in a proportion of 10-50 mass %.

7. The hot-melt composition according to claim 1, wherein a use ratio of the component (B) and the component (C) [component (B)/component (C)] is 5/4-1/15 by mass ratio.

8. The hot-melt composition according to claim 1 comprising, with respect to 100 parts by mass of the component (A), 50-100 parts by mass of the component (B), 150-300 parts by mass of the component (C), and 700-1,200 parts by mass of the component (E).

9. A sealing material comprising the hot-melt composition according to claim 1.

10. The sealing material according to claim 9, wherein a tensile strength of the sealing material at a tensile elongation of 1,000% at 20° C. is 0.8 kgf/cm$^2$ or lower.

11. The sealing material according to claim 10, which is used for a lamp housing of an automobile.

* * * * *